Sept. 16, 1930.     J. A. PAPALAS     1,775,779
CONNECTING DEVICE FOR CORRUGATED PLATES
Filed Nov. 15, 1927
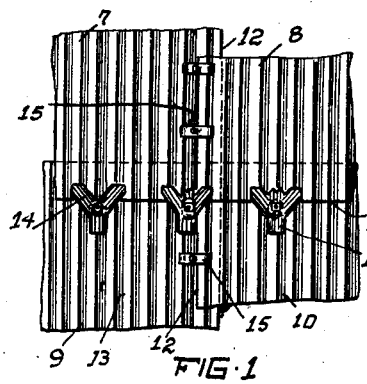
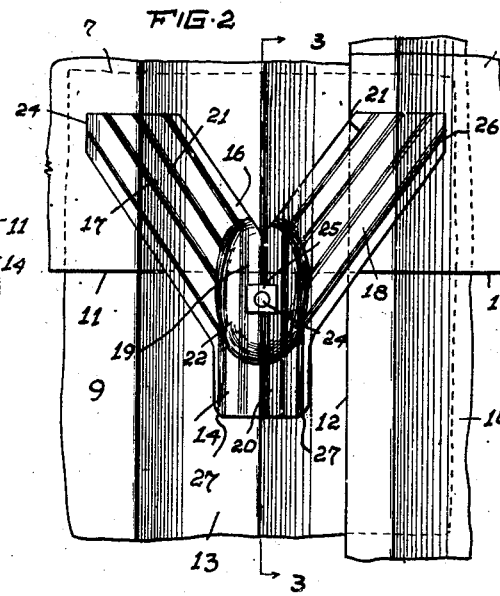
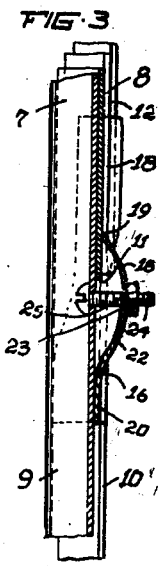
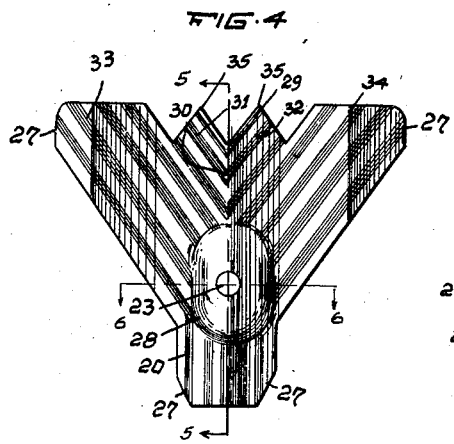
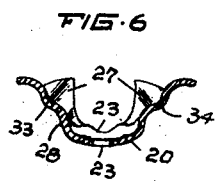
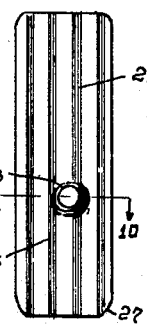
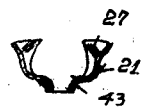
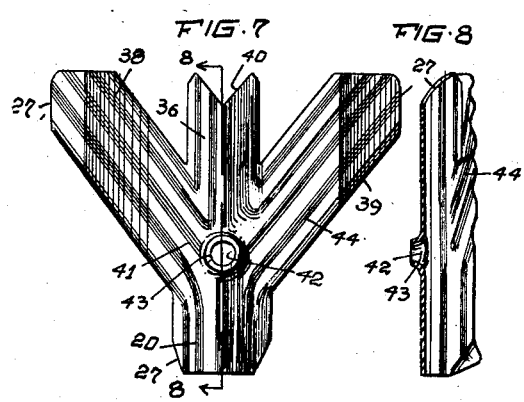
Inventor
John A. Papalas Patented Sept. 16, 1930

1,775,779

UNITED STATES PATENT OFFICE

JOHN A. PAPALAS, OF CLEVELAND, OHIO

CONNECTING DEVICE FOR CORRUGATED PLATES

Application filed November 15, 1927. Serial No. 233,505.

This invention relates to connecting devices for corrugated plates, and more especially for connecting such devices to overlapping plates and serve the additional purpose of clamping together the overlapping edges of the plates at the seams thereof and hold the plates in permanent relative position while the connecting devices are locked thereon.

It is an object of my invention to provide locking devices to be hereafter explained, for clamping the several plates together at their overlapping edges as well as holding the plates themselves in fixed position upon a supporting bar or other support member. I have arranged the connectors of proper transverse corrugated form so that they will suitably fit the corrugations of the plates to be secured together, and also form said connecting members of corrugations of smaller radius that shall extend at an angle to the corrugations of the plates—an arrangement of cross curves normally raising the body of the devices above the upper surface of the main plates, the clamping of the devices on the plates at the seams between overlapping plates serving to clamp the plates together, one portion of the devices resting upon and secured to the lower plate, while the other portion of the devices rests upon the upper plate.

It is a further object of my invention to provide the connecting devices with raised or elevated portions which bear the nuts or caps of rivets and upon being tightened, press the connectors the more forcibly upon the plates underneath. It is also my intention to provide, in some instances, annular collars or bushings about the bolt or rivet holes to further enhance the pressure exerted by the applied nuts upon the bolts.

It is a still further purpose in the application of my present improvements in connecting devices to provide connecting devices that are especially elongated, but are formed as a plain curved design having longitudinal corrugations of relatively small radius which may overlap the peak of the corrugation of adjoining sheets or plates. In any case, such elongated connector will be pressed in operative position by a nut applied to the bolt above the same.

With these objects in view, and having set forth the principles of my improvements, my invention will be seen to embody certain structural features recited in the appended claims, and illustrated in the accompanying drawings in which:

Figure 1 is a plan view of a portion of a metal wall or roof showing four plates fastened together on intersecting lines by corrugated devices at the seams;

Figure 2 is a plan view, on a larger scale, of overlapping plates with a three-armed connecting device attached to one of the plates and over-lapping the other plates, and a nut applied to a bolt and serving to force the uppermost plates down upon the lower plates;

Figure 3 is a longitudinal section taken on the line 3—3 of Fig. 2;

Figure 4 is a plan view of another form of connecting device shown unapplied;

Figure 5 is a longitudinal section taken on the line 5—5 of Fig. 4;

Figure 6 is a transverse section taken on the line 6—6 of Fig. 4;

Figure 7 is a plan view of another modification of a connecting device;

Figure 8 is a longitudinal section taken on the line 8—8 of Fig. 7, and

Figures 9 and 10 are plan and transverse sections, respectively, of still another modified form of connector, the section being taken on the line 10—10 of Fig. 9.

In the drawings the several corrugated plates are designated by the numerals 7, 8, 9 and 10, respectively, and shown in Figs. 1 and 2 applied in assembled relation with the corrugations in parallelism. The transverse edges of the plates are referred to as 11, and the edges 12 are shown as parallel to the corrugations 13. These edges 11 are shown in Figs. 1 and 2, as intersecting edges 12.

Connectors 14 of the three-winged variety are shown in Fig. 1 as designed especially to hold the edges 11 of the uppermost plates 7 and 8 against relative movement over the surface of the lower plates 9 and 10, and clips 15 are there shown as preventing lateral relative movement of the plates 8 and 10 over the surface of plates 7 and 9. The numeral 14 is to be considered as applied to the connectors of this view in a generic sense only, as three different forms are shown in this view.

In Fig. 2 of the drawings I have disclosed a form of connector 16 having arms 17 and 18 diverging from an approximate center 19, and having an integral oppositely-directed arm 20 extending from the intersection of arms 17 and 18, as shown. All three of these arms are curved about their longitudinal axis or rather the longitudinal axis of the connector body, so that the connector will have at least three parallel corrugations which will fit in superposed relation upon the peaks of the same number of corrugations 13 of the plates 7 to 10, as above stated.

Further, each of the arms 17, 18 and 20 is provided with narrower corrugations 21 which are lengthwise of the arms and on a smaller scale than the corrugations 13 of the plates to be clamped by the connectors.

I have further shown a raised portion 22 about the said intersection of these arms, and shown especially in detail in Fig. 3. This raised portion is perforated at 23 to receive therein the bolt 24 or other similar fastening having its head underneath the plate 9 and provided with a nut 25 applied upon the portion 22 thereby tending to force the connector 16 down against the plates and more especially at the tips of the arms 17, 18 and 20. This raised portion 22 is also corrugated in the direction substantially that of the arm 20 and parallel thereto.

The arms 17 and 18 have their tips 26 bent downward somewhat to contact the deepest part of the corrugations in the plates 7 and 8, and the lower end of the arm 20 is also provided with bent tips 27 pressing into the corrugations of plates 9 and 10. The general outline of the connector 16 is that of a Y and will be referred to as such in this description. Its shape and general structure gives it great strength and, applied as shown, enables pressure to be exerted upon four different plates at their intersection.

I have shown in Figs. 4, 5 and 6, a modified form of connector embodying the general principles and intended to effect the same functions as are disclosed in the description of connector 16. The modified connector 28, however, has the space between the arms 17 and 18 of connector 16, occupied, in the form 28, by sheet material for a useful purpose, the inner edges of such arms being connected by integral sheet bridging such space, such sheet including corrugated plate 29 having an intermediate peak or ridge designed to rest upon the corrugation of the sheets 7 and 9 to which this form may be applied, as in the case illustrated in the first three views of these drawings. The ridge 30 of plate 29 will be in alinement with the peak of the mid-arm 20. The outer tips 31 and 32 of the plate 29 will be in transverse alinement with the outer edges of the arms 33 and 34, there resulting from this construction two sharp points 35 which will straddle the ridge on the plates 7 and 9 underneath. This construction serves to balance the stress applied by the tips of the arms 33 and 34, a portion of it being borne by the tips 35 upon the tips 31 and 32. The ends of the arms 33, 34 and 20 will be provided in this form with the usual bent tips 27, as in the other forms.

The broadened portion of the connector 28 is provided with the narrow and oblique corrugations 21, but in addition thereto, these corrugations are extended over the intermediate plate 29 when the latter is in alinement to receive the inner corrugations 21, as shown in Fig. 4.

In Figs. 7 and 8, the intermediate plate 29 shown in the connector 28 is omitted and an elongated strip 36 substituted therefor to result in the connector 41 having the oblique corrugated arms 38 and 39 somewhat like 33 and 34 of the form 28, the lateral edges of the strip 36 being substantially parallel but said strip 36 having a single V-shaped notch 40 in its forward end, the points thereof being in lateral alinement with the outer ends of the arms 38 and 39, which latter with the arm 20 form the locking connector 41 having the aperture 42 at its approximate center to receive thereto a securing bolt or rivet.

In this connector 41, however, a bushing 43 is provided upon which the nut, such as 25, may be applied and thereby press the connecting device firmly down upon the plates of the roof or wall. Since this form of device 41 has the said bushing about its aperture 42, it does not have ordinarily, an outer raised portion, such as 22, the two features not being used together. The narrow corrugations 44 will therefore be longer than those in devices 16 and 28 which are provided with the raised portions 22. In other respects though, connectors 16 and 28 will be much alike in use and structure.

In Figs. 9 and 10, is shown the elongated connector 45 of almost parallel lateral edges and with but one arm or prong at either end, though with the same character of narrow corrugations 21 throughout its entire length. The aperture with the encircling bushing 43 are also provided in this very simplified structure. This form of connector is useful for repair work where it is not especially essential that the same connecting device shall be applied to more than two sheets. It is strong without being heavy, and may be made cheaply without weakening too seriously the force needed in binding the sheets together. Its narrow corrugations 21 enable the device to be made at small expense because of its simple and regular outline. If desired, this device may be provided with the raised portion 22 as a substitute for the bushing, and the alternative is contemplated. The small corrugations 21 are however always used because of the additional strength afforded by their use.

Having thus described the nature of this invention and the best means I have discovered for carrying the same into practical effect, what I claim and desire to secure by United States Letters Patent, is—

1. A corrugated conecting device having a notched edge at one end, and an extension at the opposite end in alinement with the notch, the said device having parallel corrugations in the direction of its length and fitting the peaks of the corrugations of the plates to which it is to be applied, there being oblique corrugations of much narrower breadth upon the notched end of the device converging at about the center of the same, and a bolt inserted in an aperture at the center of the device and adapted to enter a corresponding aperture in the plates to be fastened together, which when tightened will by the form of the fastening device exert pressure upon a plurality of said plates, both at the ends of the said device and upon the crests of said corrugations.

2. Means for connecting a series of corrugated metal plates together at their edges comprising, at least one elongated and corrugated metal device having a plurality of arms at one end and a single extension at the opposite end of the device, the said extension and all the arms being integral and each of said arms having longitudinal and relatively narrow corrugations, and said device having a perforated and raised portion at the intersection of said arms and extension, and the tips of the arms and extension having corner portions bent at an angle thereto for resting in the troughs of the corrugations of said plates.

3. A corrugated connecting device having longitudinal corrugations fitting the corrugations of the plates, and divergent arms at one end thereof with bent corners for resting in the troughs of said plate corrugations and an extension at the opposite end, the said arms having relatively narrow corrugations extending oblique to the axis of the connecting device, and there being an aperture at the approximate center of the device for receiving a securing bolt therethrough, and an annular raised bushing about said aperture.

4. A corruguated connecting device having longitudinal corrugations fitting the corrugations of the plates, divergent arms at one end thereof with bent corners for resting in the troughs of said plate corrugations, an extension at the opposite end, and longitudinal extensions in approximate alinement with the said extension but opposite thereto and positioned between said arms, there being an aperture at the approximate center of the device for receiving a securing bolt therethrough, and an annular raised bushing about said aperture.

In witness whereof I have hereunto set my hand this 14th day of November, 1927.

JOHN A. PAPALAS.